Patented Mar. 13, 1923.

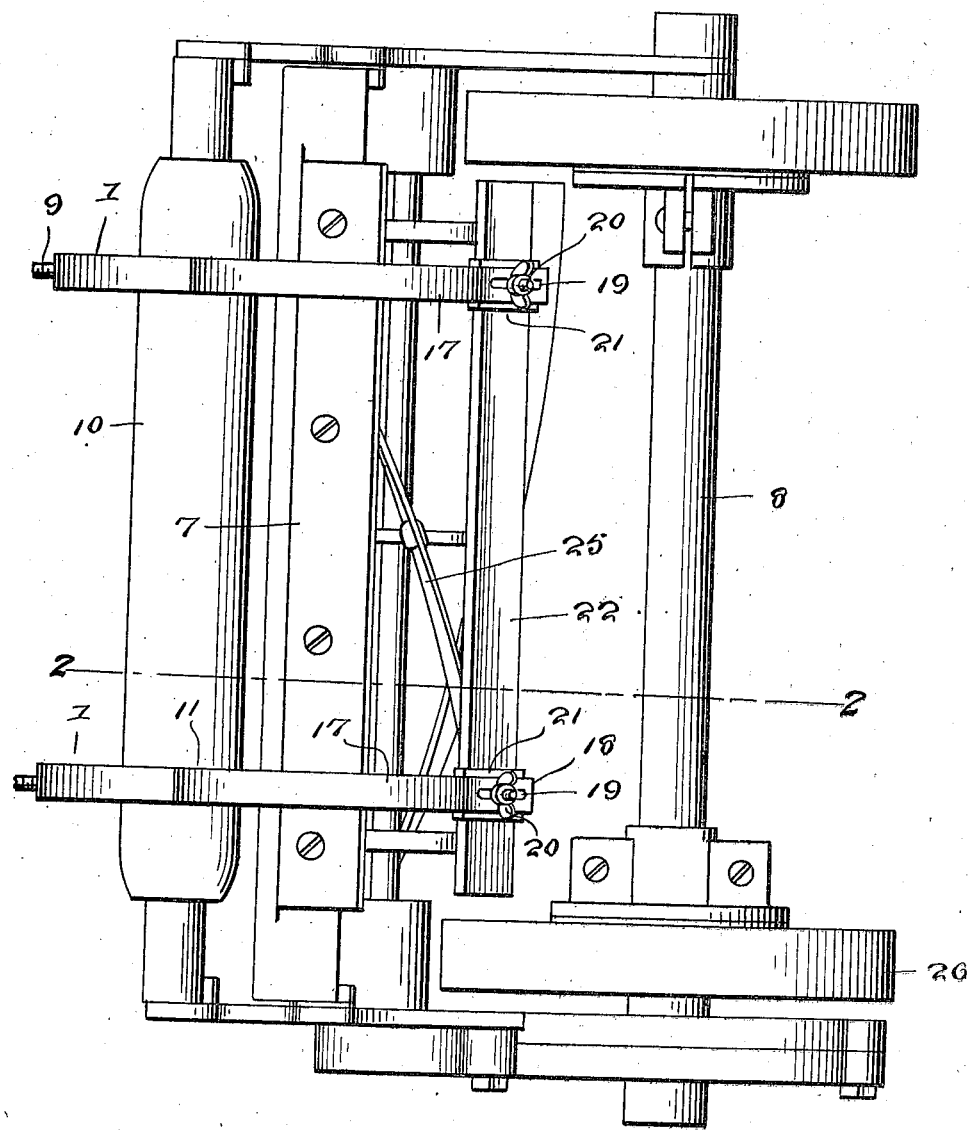

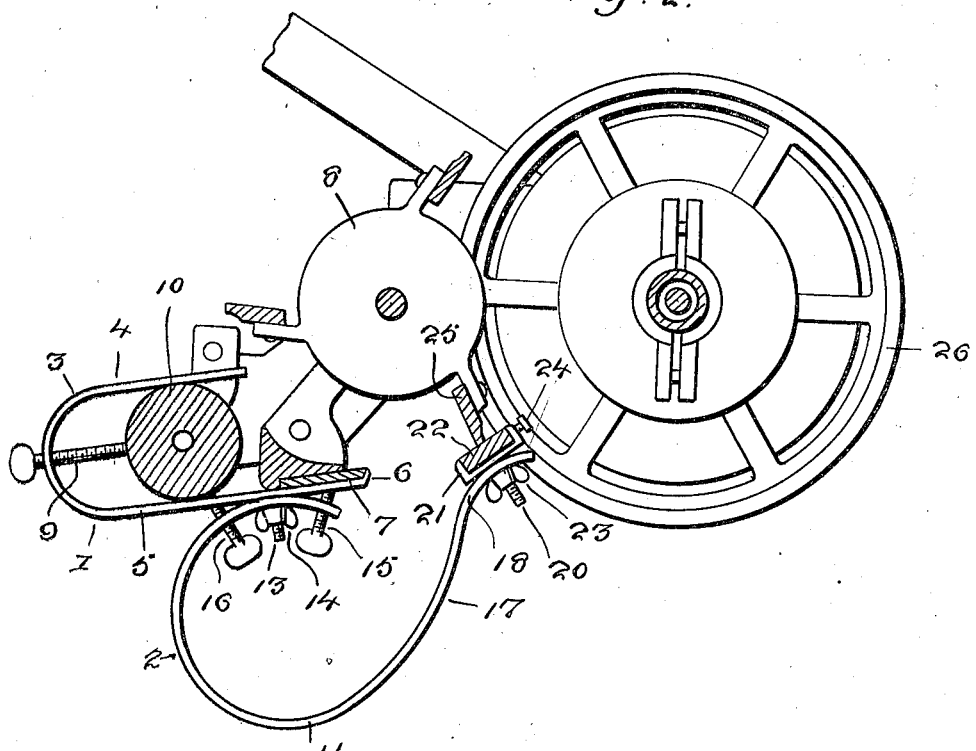
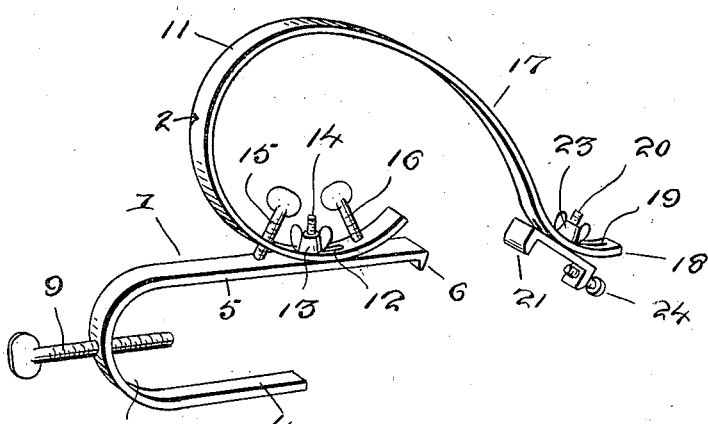

1,448,032

UNITED STATES PATENT OFFICE.

NOAH N. NEHER, OF WHITTIER, CALIFORNIA.

MOWER SHARPENER.

Application filed January 6, 1922. Serial No. 527,430.

*To all whom it may concern:*

Be it known that I, NOAH N. NEHER, a citizen of the United States, residing at Whittier, in the county of Los Angeles and State of California, have invented new and useful Improvements in Mower Sharpeners, of which the following is a specification.

My present invention has reference to a means for sharpening the cutter blades of lawn mowers.

My object is to provide a means for this purpose which can be readily secured on the mower and which carries an adjustable sharpening element in the nature of a file designed to be brought into contact with the cutters when the latter are revolved to sharpen the same.

The above, and other objects which will appear as the nature of the invention is better understood, may be accomplished by a construction, combination and operative association of parts such as is disclosed by the drawings which accompany and form part of this specification.

In the drawings:—

Figure 1 is a plan view of an inverted lawn mower illustrating the application of the improvement thereon.

Figure 2 is a sectional view on the line 2—2 of Figure 1, on a greatly enlarged scale.

Figure 3 is a perspective view of one of the members of the improvement.

As disclosed in Figure 1 of the drawings my improvement comprises a pair of clamps 1 each of which has a file holder 2 removably and adjustably secured thereon.

The clamps 1 may be made of metal straps rounded upon themselves as at 3 to provide parallel extensions in the nature of a short arm 4 and a long arm 5. The arm 5 terminates in an angularly arranged inwardly directed portion forming a hook 6, and the said hook, as disclosed in Figure 1 of the drawings is designed for engagement with the forward edge of the cutter bar 7 of the mower 8. The rounded portion of each clamp 1 has a threaded opening therethrough and through each opening there is a binding screw 9. The U-shaped portion of each of the clamps 1 is designed to receive therein the roller 10 of the mower 8.

The file or cutter holder 2, for each clamp, is of a similar construction, each being preferably formed from suitable strap metal to provide an arched or rounded inner portion 11 which rests on the arm 5 of the respective clamps 1. The arched portion 11 is adjacent to its end provided with a slot 12 which receives therethrough a bolt 13 that is secured to each of the arms 5 of the respective clamps and on each bolt there is a winged nut 14. The members 2, to the opposite sides of the slot therein have threaded openings therethrough through which are passed bolts 15 and 16 respectively. From the inner rounded or arched portion of each file holder the same is continued downwardly and outwardly as at 17, and terminates in substantially straight portions 18. The straight portions are provided with slots 19 that receive therethrough bolts 20 provided upon substantially U-shaped clamps 21 for the file 22. The bolts 20 are engaged by nuts 23 and the outer angular end of the clamps 21 has a threaded opening therethrough for a binding screw 24. The screws contact with the outer edge of the file 22 forcing the same into frictional contact with the opposite or inner flange of the clamps and thus effectively hold the file in the clamps 21. The members 2 may by adjusting the screws 15 and 16, likewise adjusting the nut 14, be made to assume any desired angle with respect to the knives or blades 25 of the mower 8, so that the same will be brought to a position to be contacted by the said blades when the ground wheel 26 of the mower is revolved. This may be accomplished by attaching a handle to one of the wheels or if desired the mower when in inverted position may be arranged upon the ground and pushed in the usual manner.

The construction as above described is extremely simple, may be cheaply manufactured, readily applied to any ordinary construction of lawn mowers and will effectively perform the function for which it is devised, but the nature of the invention is such as to render the same susceptible to modifications and therefore it is to be understood that I am entitled to all such changes as fall within the scope of what is claimed.

Having described the invention what I claim is:—

A means for sharpening the cutter blades of a lawn mower, comprising substantially U-shaped clamps each having one of its arms at its outer end hooked to engage the forward edge of the cutter bar of a mower, and a roller received between the arms of the clamps, a binding screw at the rounded portion of each of the clamps contacting with the roller, a file holder for each of the clamps, each of said holders having its inner portion arched and resting on one of the arms of the respective clamps, means between said holders and said arms of the clamps for permitting a rocking movement of the holders on the clamps, means carried by the holders and contacting with the clamps for holding said holders at desired inclinations on said clamps each of said holders from the said arched portion being extended outwardly and terminating in a substantially straight portion, U-shaped members at the said straight ends of the holders, means securing said members to said holders and permitting a longitudinal adjustment of the members on the holders, a sharpening file received in the U-shaped members, and securing means between said members and said file.

In testimony whereof I affix my signature.

NOAH N. NEHER.